Patented July 2, 1935

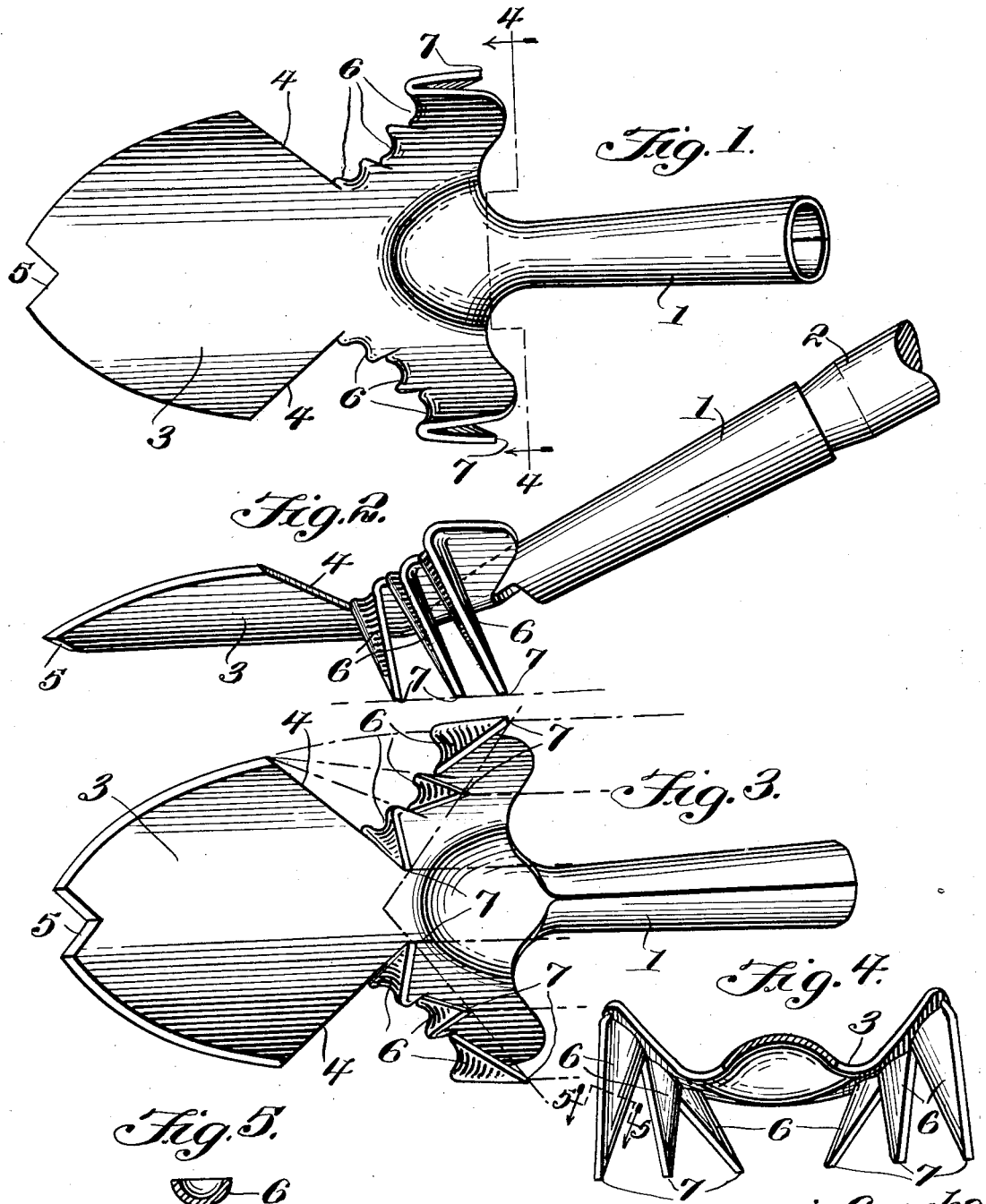

2,006,672

UNITED STATES PATENT OFFICE 2,006,672

GARDEN TOOL

Emma Lydia Combs, Tinley Park, Ill.

Application December 7, 1932, Serial No. 646,170
Renewed November 21, 1934

2 Claims. (Cl. 97—66)

This invention relates to tools, and its general object is to provide a garden tool that may be formed from a single piece of metal suitable for that purpose or made from any number of pieces, but in any event is capable of weeding, cutting, transplanting, cultivating and the like in an easy and expeditious manner with very little effort on the part of the user.

A further object of the invention is to provide a tool of the character set forth, that is simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1 is a top plan view of the tool which forms the subject matter of the present invention.

Figure 2 is a side elevation thereof showing an extension handle applied thereto.

Figure 3 is a bottom plan view.

Figure 4 is a sectional view taken approximately on line 4—4 of Figure 1, looking in the direction of the arrows.

Figure 5 is a sectional view taken approximately on line 5—5 of Figure 4, looking in the direction of the arrows.

Referring to the drawing in detail, it will be noted that my tool may be formed from a single piece of metal that has one end portion rolled transversely from the longitudinal center thereof to provide a hollow shank 1 which forms the handle of my tool as well as a socket to accommodate an extension handle 2. The hollow shank merges into the body 3 of my tool, and it will be noted that the hollow shank is disposed at an upward inclination from said body. The body is curved transversely upon itself and is tapered from recesses 4 to its forward end as best shown in Figure 3. The forward end is notched in substantially V-shape formation as at 5, and the tapered edge of the body as well as the edge of the notch is sharpened, so that the tool can be used in hard earth and for the purpose of cutting roots and the like. The sharpened notch 5 is extremely useful in uprooting dandelions and the like.

The recesses 4 which are substantially V-shaped and arranged upon diametrically opposite sides of the body 3 are provided by splitting the body as shown by the dash lines in Figure 3, and these split portions are downturned to be disposed at a rearward angle with respect to the body to form diverging groups of teeth 6 on the rear edges of the recesses and are transversely curved upon themselves in order to add strength thereto and the teeth are substantially triangular in formation and terminate in penetrating points 7.

From the above description and disclosure of the drawing, it will be obvious that I have provided a garden tool that can be used for practically every purpose in a garden, and the body 3 is of a size and shape, whereby it can be used as a trowel, and the teeth are of course designed for cultivating the soil about plants and the like as well as removing weeds. The use of the notch 5 has been previously set forth, and the tool is extremely efficient for the purpose intended.

While I have shown and described my tool as being formed from a single piece of metal, I want it understood that it can be made from any number of pieces without departing from the spirit of the invention. In fact, the tool includes three major portions, namely, the handle portion, the toothed portion and the trowel portion which may be made separately, and joined by any well known means. Again, the tool can be made from two pieces, one being formed to provide the handle and toothed portion, and the other piece the trowel portion, but regardless of how the tool is made, its efficiency will not be impaired and in some instances will be materially increased, especially the strength thereof, as the parts can be braced where joined, and in that event a tool made from a number of pieces of material properly braced will be stronger than a tool formed from a single piece, as shown.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A garden tool comprising a body including a toothed portion with the teeth thereof arranged in diverging groups upon opposite sides and extending downwardly at a rearward angle therefrom, said teeth being curved transversely and terminating into penetrating points, a notched trowel portion included in the body, and a socketed handle for the body to receive a handle extension.

2. A garden tool comprising a body having substantially V-shaped recesses arranged upon its opposite sides and dividing the same into a trowel portion and a toothed portion, the teeth of the latter following the rear edge of the recesses for arrangement in diverging groups and a handle for the body.

EMMA LYDIA COMBS.